(12) United States Patent
Kurata et al.

(10) Patent No.: US 11,392,307 B2
(45) Date of Patent: Jul. 19, 2022

(54) DATA-PROTECTION-AWARE CAPACITY PROVISIONING OF SHARED EXTERNAL VOLUME

(71) Applicant: Hitachi, Ltd., Tokyo (JP)

(72) Inventors: Naruki Kurata, San Jose, CA (US); Tomohiro Kawaguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/931,220

(22) Filed: Jul. 16, 2020

(65) Prior Publication Data

US 2022/0019361 A1    Jan. 20, 2022

(51) Int. Cl.
*G06F 3/06* (2006.01)

(52) U.S. Cl.
CPC ............ *G06F 3/0631* (2013.01); *G06F 3/067* (2013.01); *G06F 3/0619* (2013.01); *G06F 3/0665* (2013.01); *G06F 3/0689* (2013.01)

(58) Field of Classification Search
CPC ...... G06F 3/0631; G06F 3/0665; G06F 3/067; G06F 3/0689

USPC .................................................. 711/154, 114
See application file for complete search history.

(56) References Cited

U.S. PATENT DOCUMENTS

| | | | |
|---|---|---|---|
| 7,904,749 B2 | 3/2011 | Kawaguchi | |
| 9,003,087 B2 | 4/2015 | Imazaki et al. | |
| 9,250,809 B2 | 2/2016 | Yamamoto et al. | |
| 2013/0212337 A1* | 8/2013 | Maruyama | G06F 11/3419 711/147 |
| 2013/0275678 A1* | 10/2013 | Matsui | G06F 3/0635 711/117 |
| 2018/0189109 A1* | 7/2018 | Nagai | G06F 9/5077 |

* cited by examiner

*Primary Examiner* — Than Nguyen
(74) *Attorney, Agent, or Firm* — Procopio, Cory, Hargreaves & Savitch LLP

(57) ABSTRACT

Example implementations described herein facilitate a drive unit to share physical mediums (e.g. solid state drives) among multiple storage controllers or storage nodes in a distributed storage system, while keeping them physically independent in a redundancy group to avoid single point of failure, by providing an interface to notify redundancy group to the drive unit.

12 Claims, 19 Drawing Sheets

| Physical medium ID | Installed? | Capacity |
|---|---|---|
| 0 | Yes | 2TB |
| 1 | Yes | 2TB |
| 2 | Yes | 2TB |
| 3 | Yes | 4TB |
| 4 | Yes | 4TB |
| 5 | No | - |
| ••• | ••• | ••• |
| 23 | No | - |

FIG. 3

| Controller ID | Virtual Medium ID | Physical Medium ID | Physical Medium Start Address | Size |
|---|---|---|---|---|
| 0 | 0 | 0 | 0x00000000 | 512GB |
| 1 | 0 | 1 | 0x00000000 | 256GB |
| 0 | 1 | 2 | 0x00000000 | 512GB |
| 0 | 2 | 3 | 0x00000000 | 512GB |
| 1 | 1 | 4 | 0x00000000 | 512GB |
| ... | ... | ... | ... | ... |

FIG. 4(a)

| Current Physical Medium | Corresponding Virtual Medium |
|---|---|
| 0 | 0 |
| 1 | 1 |
| ... | ... |

FIG. 4(b)

| Controller ID | Virtual Medium ID | Physical Medium ID | Physical Medium Start Address | Size |
|---|---|---|---|---|
| 0 | 0 | 0 | 0x00000000 | 512GB |
| 1 | 0 | 1 | 0x00000000 | 256GB |
| 0 | 1 | 2 | 0x00000000 | 512GB |
| 0 | 2 | 3 | 0x00000000 | 512GB |
| 1 | 1 | 4 | 0x00000000 | 265GB |
| 0 | 3 | 1 | 0x10000000 | 512GB |
| ... | ... | ... | ... | ... |

FIG. 13

| Virtual Medium ID | Physical Medium ID | Physical Medium Start Address | Size |
|---|---|---|---|
| 0 | 0 | 0x00000000 | 512GB |
| 1 | 2 | 0x00000000 | 512GB |
| 2 | 3 | 0x00000000 | 512GB |
| ... | ... | ... | ... |

FIG. 14

DATA-PROTECTION-AWARE CAPACITY PROVISIONING OF SHARED EXTERNAL VOLUME

BACKGROUND

Field

The present disclosure relates generally to storage systems, and more specifically, to data-protection-aware capacity provisioning for shared external volumes.

Related Art

Recently, solid state drives (SSDs) are commonly used for IT platform systems because of its high capacity and performance. As SSDs have such high capacity and performance, processing performance of CPUs in a storage controller is not able to keep up with these resources and they are underutilized. To utilize them, chunking SSDs, showing each chunk as a virtual drive and sharing these virtual drives among multiple storage controllers is one solution. However, a naïve method causes a single point of failure. One example is that if the storage controller makes a set of virtual storage media as a RAID (Redundant Array of Independent (Inexpensive) Disks) group for reliability, there is no guarantee that each virtual storage medium is derived from independent physical drives. When at least two of the virtual storage media are derived from the same physical drive, it ends up with failure when that physical drive fails.

SUMMARY

Aspects of the present disclosure can involve a drive unit, involving a plurality of physical mediums; a plurality of virtual mediums distributed across the plurality of physical mediums; and a processor, configured to, determine, from a virtual medium allocation request received from a storage controller of the one or more storage controllers, a controller identifier of the storage controller; determine a first set of the plurality of virtual mediums allocated to the storage controller based on the controller identifier; determine a second set of the plurality of physical mediums corresponding to the first set of the plurality of virtual mediums allocated to the storage controller; and respond to the virtual medium allocation request with a third set of the plurality of virtual mediums corresponding to remaining ones of the plurality of physical mediums outside of the second set of the plurality of physical mediums.

Aspects of the present disclosure can involve a method for a drive unit involving a plurality of physical mediums; a plurality of virtual mediums distributed across the plurality of physical mediums; the method involving determining, from a virtual medium allocation request received from a storage controller of the one or more storage controllers, a controller identifier of the storage controller; determining a first set of the plurality of virtual mediums allocated to the storage controller based on the controller identifier; determining a second set of the plurality of physical mediums corresponding to the first set of the plurality of virtual mediums allocated to the storage controller; and responding to the virtual medium allocation request with a third set of the plurality of virtual mediums corresponding to remaining ones of the plurality of physical mediums outside of the second set of the plurality of physical mediums.

Aspects of the present disclosure can involve a non-transitory compute readable medium, storing instructions for executing a process for a drive unit involving a plurality of physical mediums; a plurality of virtual mediums distributed across the plurality of physical mediums; the instructions involving determining, from a virtual medium allocation request received from a storage controller of the one or more storage controllers, a controller identifier of the storage controller; determining a first set of the plurality of virtual mediums allocated to the storage controller based on the controller identifier; determining a second set of the plurality of physical mediums corresponding to the first set of the plurality of virtual mediums allocated to the storage controller; and responding to the virtual medium allocation request with a third set of the plurality of virtual mediums corresponding to remaining ones of the plurality of physical mediums outside of the second set of the plurality of physical mediums.

Aspects of the present disclosure can involve a drive unit involving a plurality of physical mediums; a plurality of virtual mediums distributed across the plurality of physical mediums; means for determining, from a virtual medium allocation request received from a storage controller of the one or more storage controllers, a controller identifier of the storage controller; means for determining a first set of the plurality of virtual mediums allocated to the storage controller based on the controller identifier; means for determining a second set of the plurality of physical mediums corresponding to the first set of the plurality of virtual mediums allocated to the storage controller; and means for responding to the virtual medium allocation request with a third set of the plurality of virtual mediums corresponding to remaining ones of the plurality of physical mediums outside of the second set of the plurality of physical mediums.

Aspects of the present disclosure involve a storage controller managing a redundant array of inexpensive disk (RAID) group of virtual mediums and connected to a drive unit configured to provide physical mediums for the RAID group of virtual mediums, the storage controller involving a processor, configured to provide a virtual medium allocation request involving a controller identifier of the storage controller to the drive unit; receive a set of virtual mediums eligible for inclusion into the RAID group, the set of virtual mediums corresponding to physical mediums in the drive unit that are unused in the RAID group; and allocate one or more virtual mediums from the set of virtual mediums to the RAID group.

Aspects of the present disclosure involve a method for a storage controller managing a redundant array of inexpensive disk (RAID) group of virtual mediums and connected to a drive unit configured to provide physical mediums for the RAID group of virtual mediums, the method involving providing a virtual medium allocation request involving a controller identifier of the storage controller to the drive unit; receiving a set of virtual mediums eligible for inclusion into the RAID group, the set of virtual mediums corresponding to physical mediums in the drive unit that are unused in the RAID group; and allocating one or more virtual mediums from the set of virtual mediums to the RAID group.

Aspects of the present disclosure involve a non-transitory computer readable medium for a storage controller managing a redundant array of inexpensive disk (RAID) group of virtual mediums and connected to a drive unit configured to provide physical mediums for the RAID group of virtual mediums, the instructions involving providing a virtual medium allocation request involving a controller identifier of the storage controller to the drive unit; receiving a set of virtual mediums eligible for inclusion into the RAID group, the set of virtual mediums corresponding to physical mediums in the drive unit that are unused in the RAID group; and allocating one or more virtual mediums from the set of virtual mediums to the RAID group.

Aspects of the present disclosure involve a storage controller managing a redundant array of inexpensive disk (RAID) group of virtual mediums and connected to a drive unit configured to provide physical mediums for the RAID group of virtual mediums, the storage controller involving means for providing a virtual medium allocation request involving a controller identifier of the storage controller to the drive unit; means for receiving a set of virtual mediums eligible for inclusion into the RAID group, the set of virtual mediums corresponding to physical mediums in the drive unit that are unused in the RAID group; and means for allocating one or more virtual mediums from the set of virtual mediums to the RAID group.

Aspects of the present disclosure can involve a distributed system involving a plurality of distributed storage nodes managing a chunk group of virtual mediums for a corresponding pool volume, and connected to a drive unit configured to provide physical mediums for the chunk group of virtual mediums, each of the plurality of distributed nodes involving a processor, configured to provide a virtual medium allocation request comprising an identifier of the each of the plurality of distributed nodes to the drive unit; receive a set of virtual mediums eligible for inclusion into the chunk group, the set of virtual mediums corresponding to physical mediums in the drive unit that are unused in the chunk group; and allocate one or more virtual mediums from the set of virtual mediums to the chunk group.

BRIEF DESCRIPTION OF DRAWINGS

FIG. 3 illustrates an example of a physical medium table that shows if each physical medium corresponding to the physical medium identifier (ID) exists, in accordance with an example implementation.

FIG. 4(a) illustrates an example of a medium mapping table, in accordance with an example implementation.

FIG. 4(b) illustrates example RAID information for managing the RAID group, in accordance with an example implementation.

FIG. 13 illustrates the medium mapping table as updated from the example of FIG. 4, in accordance with an example implementation.

FIG. 14 illustrates an example controller medium mapping table, in accordance with an example implementation.

DETAILED DESCRIPTION

Figure 1:
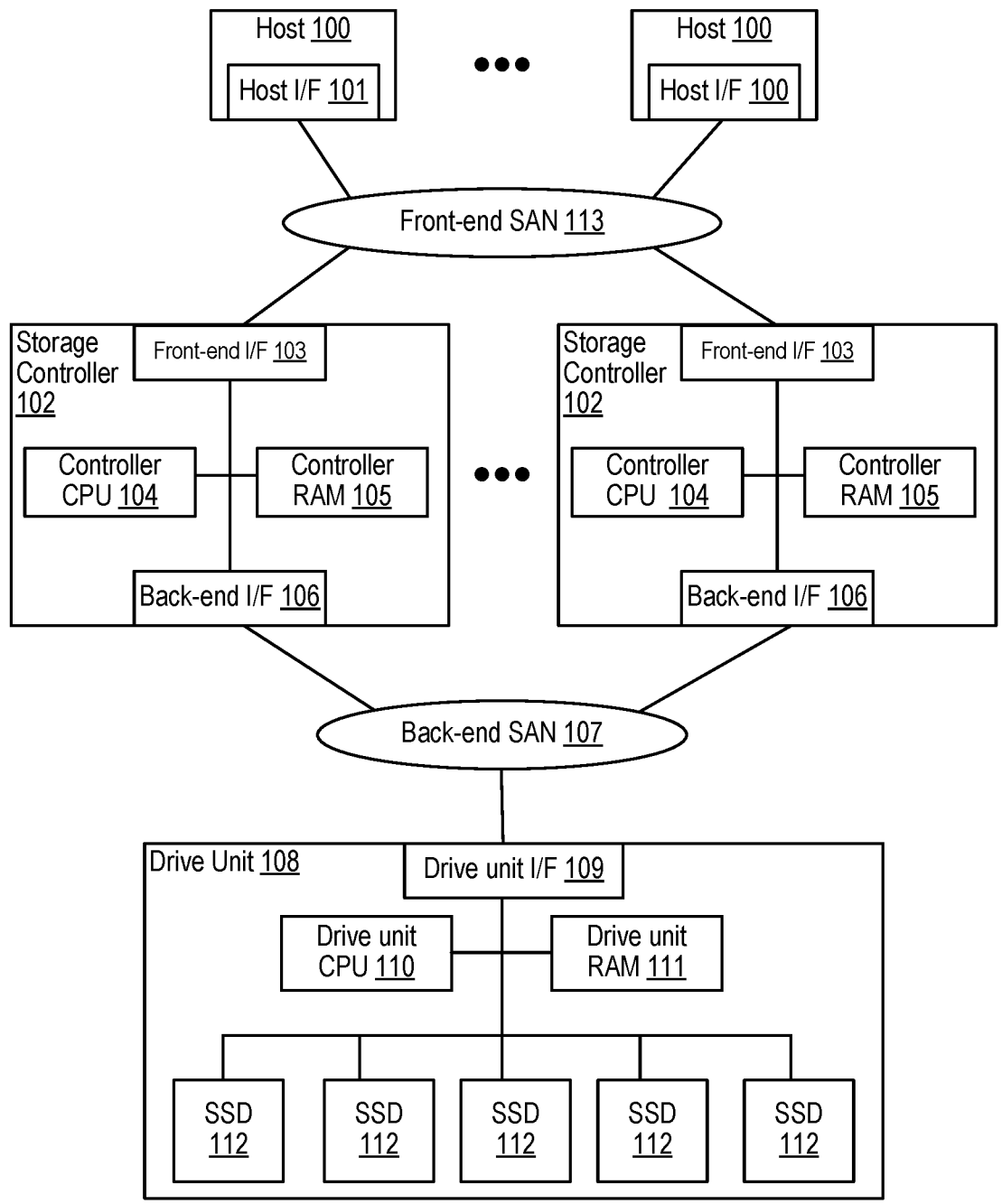
FIG. 1 illustrates an overview of an example implementation of a computer system.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The following example implementations involve computer systems which provide both data integrity and storage medium sharing capability as a form of storage controller and drive unit.

FIG. 1 illustrates an overview of an example implementation of a computer system. The computer system involves of one or more hosts 100, one or more storage controllers 102 and a drive unit 108. The hosts 100 are connected to the storage controllers 102 via a front-end Storage Area Network (SAN) 113. The drive unit 108 is connected to the storage controllers 102 via a back-end SAN 107.

A host 100 is a computer that runs user application programs. The host 100 connects to the storage controllers 102 via the front-end SAN 113 through a host interface (I/F) 101 and accesses to a storage area provided by the storage controllers 102. The host 100 requests the storage controllers 102 to store and retrieve data to/from storage 112 in the drive unit 108. In the example of FIG. 1, the storage 112 is in the form of Solid State Drives (SSDs), however, other storage mediums (e.g., hard disk drive (HDDs)) can also be utilized in accordance with the desired implementation, and the present disclosure is not limited thereto.

A storage controller 102 can involve a front-end I/F 103, a back-end I/F 106, a controller Central Processing Unit (CPU) 104 and a controller Random Access Memory (RAM) 105. In example implementations described herein, CPU can be in the form of physical hardware processors, or in the form of a combination of hardware and software processors depending on the desired implementation. The front-end I/F 103 is an interface that communicate with hosts via the front-end SAN 113. The back-end I/F 106 is an interface that communicates with drive unit 108 via the back-end SAN 107. The controller RAM 105 can include an area where a program and metadata used by the controller CPU 104 to control the storage controller 102 is stored, and a cache memory area where data is temporarily stored. The controller RAM 105 can be volatile medium or non-volatile medium depending on the desired implementation.

A drive unit 108 involves a drive unit I/F 109, a drive unit CPU 110 and a drive unit RAM 111. The drive unit I/F 109 is an interface that communicate with storage controllers via the back-end SAN 107. The drive unit RAM 111 can include an area where a program and metadata which is used by the drive unit CPU 110 to control the drive unit is stored, and a cache memory area where data is temporarily stored. The drive unit RAM 111 can be volatile medium or non-volatile medium.

In an example implementation, the front-end SAN 113 and the back-end SAN 107 are physically separated networks, but they can be logically separated networks by using a technology e.g. virtual LAN (VLAN), or can also be implemented as the same network in accordance with the desired implementation.

In example implementations described herein, CPU 110 can be configured to determine, from a virtual medium allocation request received from a storage controller of the one or more storage controllers, a controller identifier of the storage controller; determine a first set of the plurality of virtual mediums allocated to the storage controller based on the controller identifier; determine a second set of the plurality of physical mediums corresponding to the first set of the plurality of virtual mediums allocated to the storage controller; and respond to the virtual medium allocation request with a third set of the plurality of virtual mediums corresponding to remaining ones of the plurality of physical mediums outside of the second set of the plurality of physical mediums as illustrated from FIGS. 5-16.

As illustrated in FIGS. 2-16, the plurality of virtual mediums are configured to be provided to one or more redundant array of inexpensive disk (RAID) groups, wherein the request can include RAID group information corresponding to the storage controller, the RAID group information involving one or more of the first set of the plurality of virtual mediums and the second set of the plurality of physical mediums.

As illustrated in FIG. 4(*a*), memory such as drive unit RAM 111 can be configured to manage a mapping between controller identifiers, the plurality of virtual mediums, and the plurality of physical mediums, wherein the CPU 110 is configured to determine the first set of the plurality of virtual mediums allocated to the storage controller based on the controller identifier through referring to the mapping between the controller identifiers and the plurality of virtual mediums; and determine the second set of the plurality of physical mediums corresponding to the first set of the plurality of virtual mediums allocated to the storage controller through referring to the mapping between the plurality of virtual mediums and the plurality of physical mediums.

As illustrated in FIG. 4(*b*), the virtual medium allocation request can also involve the second set of physical mediums, wherein the CPU 110 is configured to determine the second set of the plurality of physical mediums corresponding to the first set of the plurality of virtual mediums allocated to the storage controller from the request as illustrated in FIGS. 5-8.

Further, the implementations illustrate in FIGS. 2-16 are also interchangeable with functions in the storage controller instead of the drive unit to facilitate the desired implementation. For example, CPU 104 can be configured to provide a virtual medium allocation request involving a controller identifier of the storage controller to the drive unit; receive a set of virtual mediums eligible for inclusion into the RAID group, the set of virtual mediums corresponding to physical mediums in the drive unit that are unused by the storage controller; and allocate one or more virtual mediums from the set of virtual mediums to the RAID group through the processes of FIGS. 5-8 based on the information of FIG. 4(*a*). As illustrated in FIG. 4(*b*), the virtual medium allocation request can involve RAID group information corresponding to the storage controller, the RAID group information comprising one or more of a first set of a plurality of virtual mediums allocated to the RAID group and a second set of a plurality of physical mediums allocated to the RAID group. In another example of FIG. 4(*b*), the virtual medium allocation request can involve a set of the physical mediums allocated to the storage controller.

Figure 2:
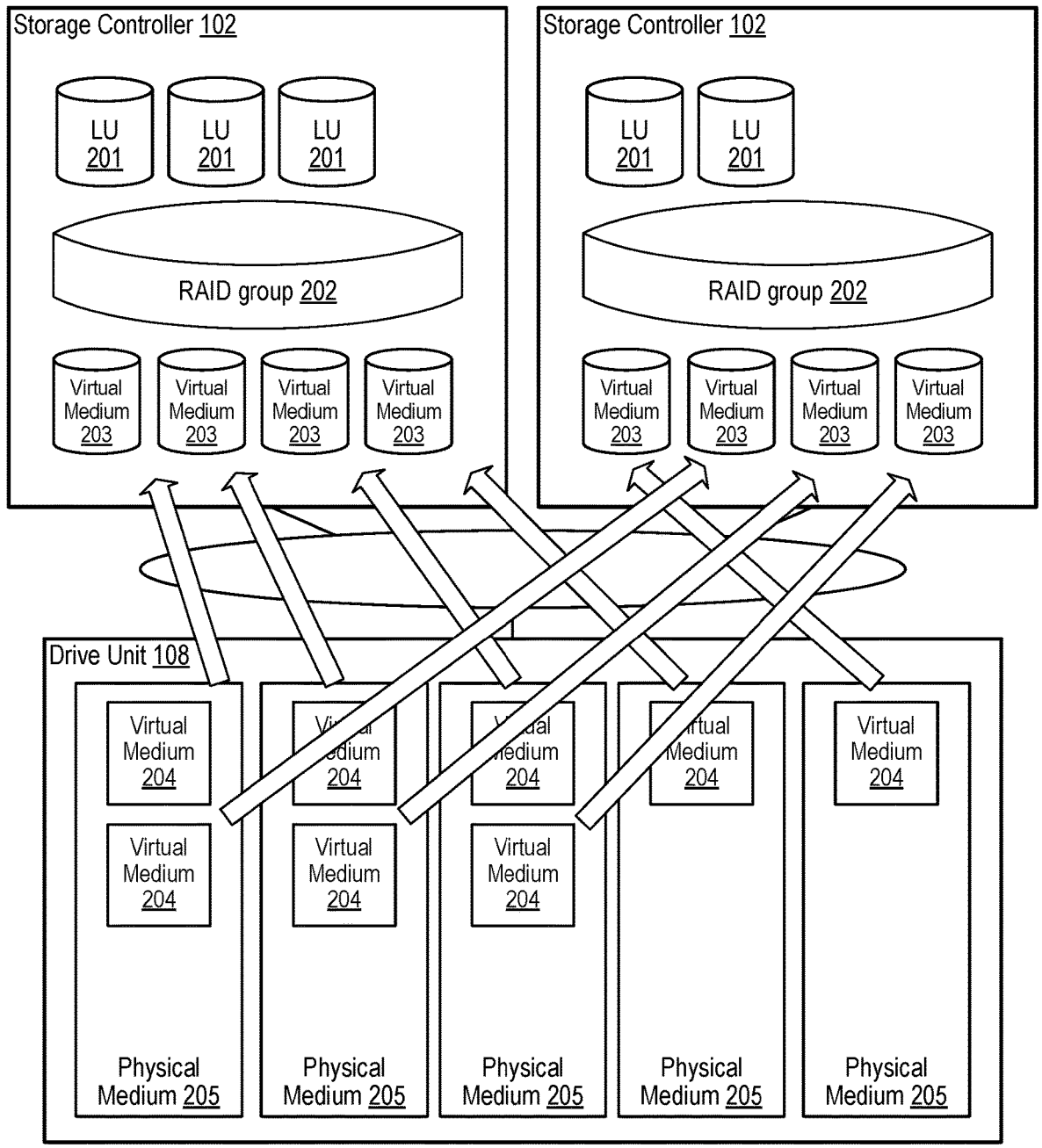
FIG. 2 illustrates a logical configuration of the computer system, in accordance with an example implementation.

FIG. 2 illustrates a logical configuration of the computer system, in accordance with an example implementation. In the example implementation, the drive unit 108 has a capability of providing a part of the capacity in the physical medium 205 as a virtual medium 204 to the storage controllers 102 as the virtual medium 203 of the storage controllers 102. The storage controllers 102 have a capability of controlling multiple storage media as a RAID (Redundant Array of Independent (Inexpensive) Disks) group 202 for reliability. The storage media for the RAID group 202 can be physical media, or virtual media provided by the drive unit 108. A logical unit (LU) 201 involves a portion of the RAID group. The LU is a unit of storage recognized by a host 100.

FIG. 3 illustrates an example of a physical medium table that shows if each physical medium corresponding to the physical medium identifier (ID) exists, in accordance with an example implementation. In the example figure, physical medium 0 to 4 are installed in the drive unit. The table also shows the total capacity of each physical medium. This example indicates that physical medium 0 to 2 have 2 TB of capacity and physical medium 3 and 4 have 4 TB.

FIG. 4(*a*) illustrates an example of a medium mapping table, in accordance with an example implementation. The table manages information for translating a virtual medium to the corresponding physical medium. Each row describes information of each virtual medium. The controller ID field describes an identification number of the controller to which a virtual medium corresponds to. The virtual medium ID field describes an identification number of a virtual medium. The physical medium ID field describes an identification number of the physical medium to which a virtual medium corresponds to. The physical medium start address field describes an address of the physical medium where a virtual medium starts. In this example implementation, a virtual medium involves a portion of consecutive addresses of a physical medium, but is not limited thereto. The size field describes a size of the corresponding virtual medium.

FIG. 4(b) illustrates example RAID information for managing the RAID group, in accordance with an example implementation. The RAID information can be managed by the storage controller or the drive unit, depending on the desired implementation. Each RAID group managed by the storage controller can be managed with the RAID information as illustrated in FIG. 4(b). Specifically, FIG. 4(b) illustrates the relationship between the current physical mediums to their corresponding virtual mediums for a particular RAID group managed by a particular storage controller. As illustrated in FIG. 4(b), as two or more virtual mediums derived from the same physical medium cannot be in the same RAID group, each physical medium in the RAID group corresponds to a particular virtual medium.

Figure 5:
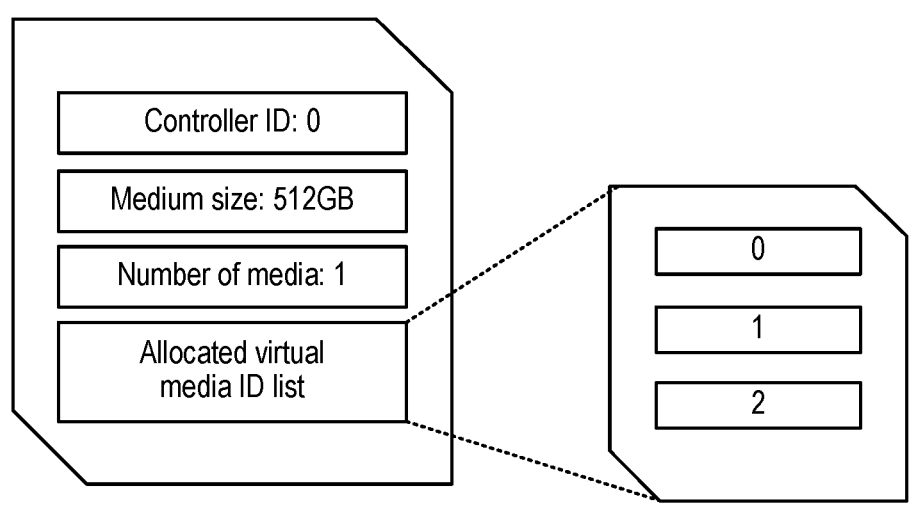
FIG. 5 illustrates an example of virtual medium request information, in accordance with an example implementation.

FIG. 5 illustrates an example of virtual medium request information, in accordance with an example implementation. A storage controller sends a request to a drive unit when the controller needs a new virtual medium. The controller ID field shows an ID of the controller that requested a new virtual media. The medium size field describes a size of each requested new medium. The number of media field describes the number of media that the controller requests. The allocated virtual media ID list describes a list of virtual media IDs where the storage controller already uses in the RAID group that the controller requests a new virtual media. In the example of FIG. 5, the ID of the controller that requested a new virtual medium is 0, the requested medium size is 512 GB each, and the number of media requested by the controller is 1. The allocated virtual media list in FIG. 5 indicates that allocated virtual medium IDs are 0, 1 and 2.

Figure 6:
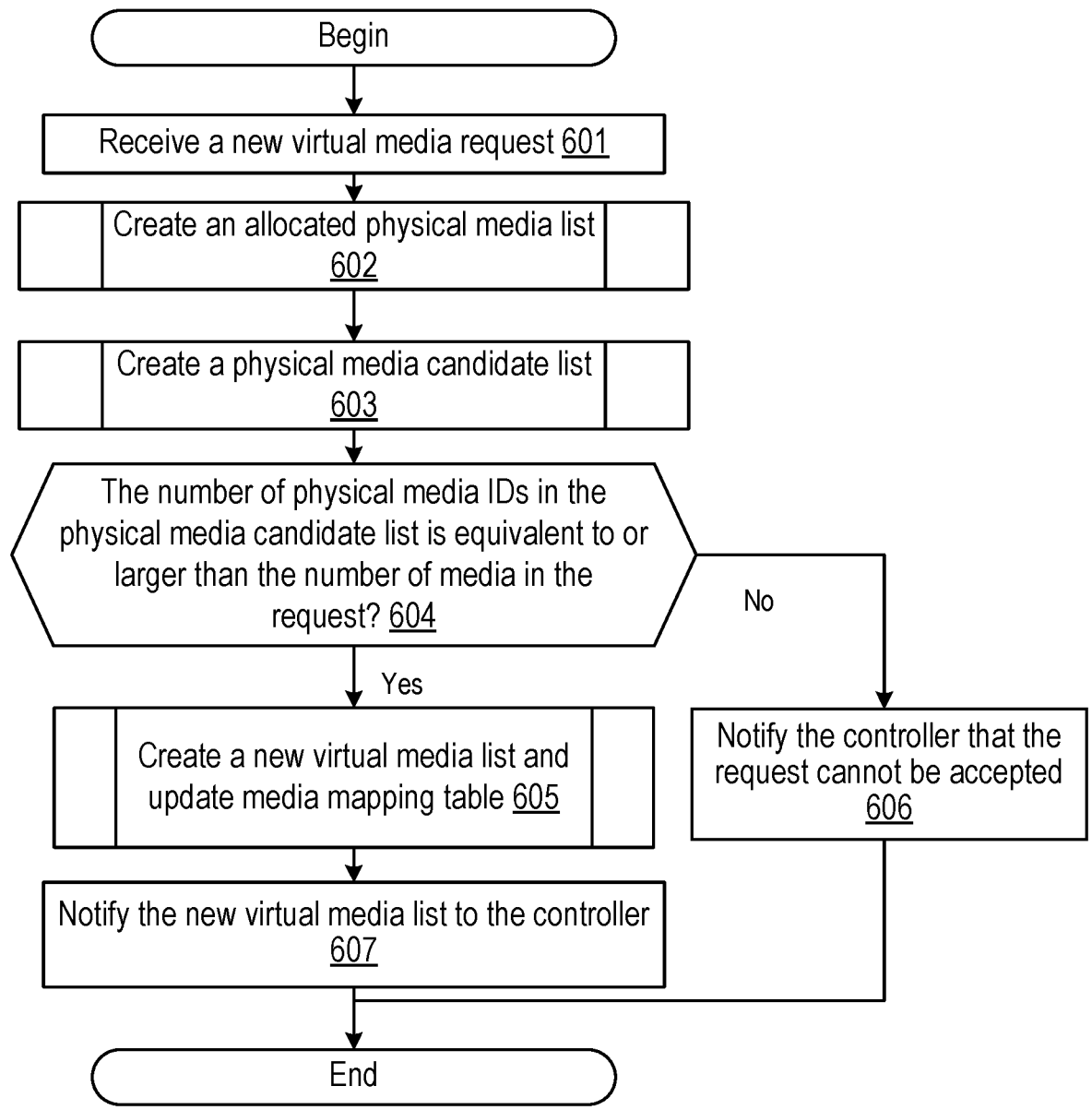
FIG. 6 illustrates an example of a flow diagram for the drive unit providing a new virtual media to a storage controller, in accordance with an example implementation.

FIG. 6 illustrates an example of a flow diagram for the drive unit providing a new virtual media to a storage controller, in accordance with an example implementation. At 601, the drive unit receives a new virtual media request from a storage controller as illustrated in FIG. 5. At 602, the drive unit creates an allocated physical media list corresponding to the request. The allocated physical media list describes a list of IDs of physical media that the storage controller already uses in the RAID group. Further details of this process are described in FIG. 7.

At 603, the drive unit creates a physical media candidate list. The physical media candidate list describes a list of IDs of physical media that can be used for providing virtual media requested by the storage controller. Further details of this process are provided in FIG. 9.

At 604, the drive unit checks if the number of IDs in the physical media candidate list is equivalent to or larger than the number of media in the request. If the number of IDs in the physical media candidate list is less than the number of media in the request (No), the drive unit notifies the storage controller that the request cannot be accepted at 606 and ends the flow.

If the number of IDs in the physical media candidate list is equivalent to or larger than the number of media in the request (Yes), the drive unit creates a new virtual media list and updates the media mapping table corresponding to the new virtual media list at 605. Further details of this process are described in FIG. 11. Finally, the drive unit notifies the new virtual media list to the controller at 607.

Figure 7:
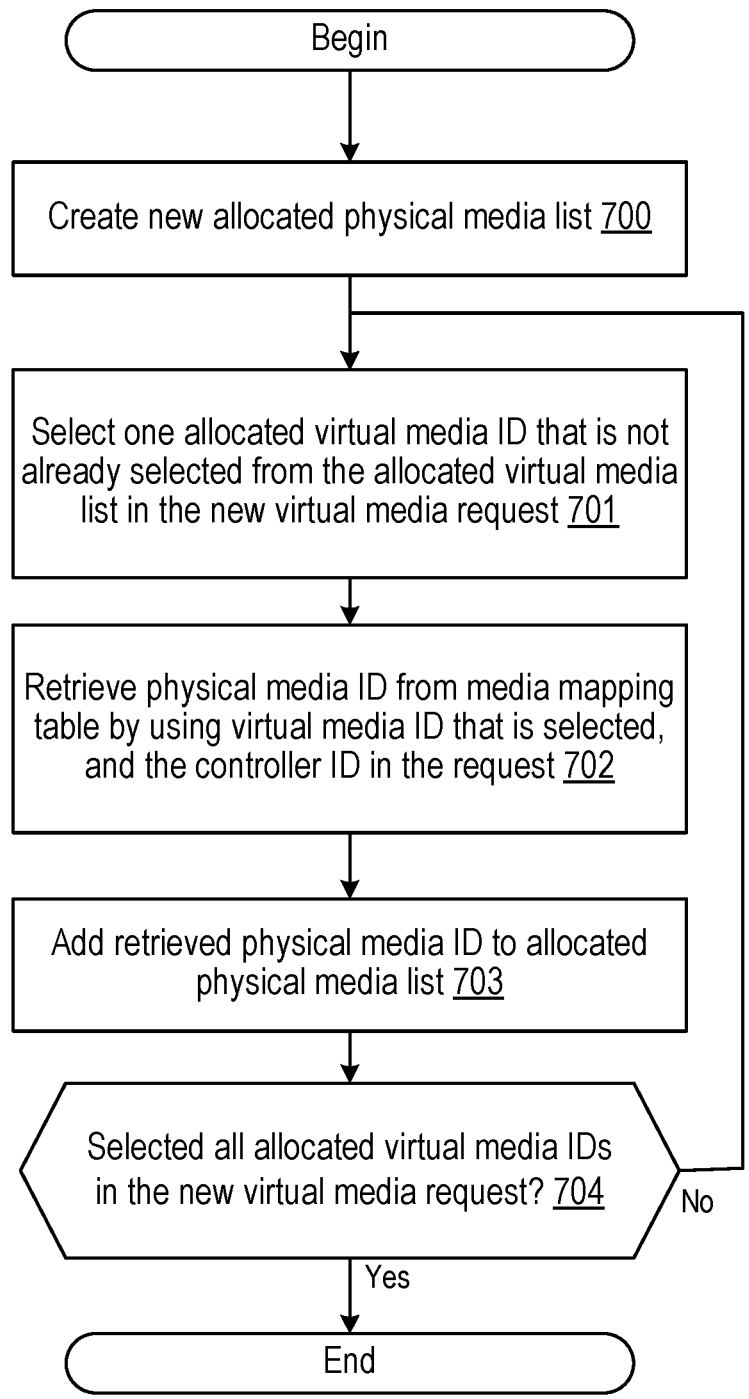
FIG. 7 illustrates an example of a flow diagram for the drive unit creating an allocated physical media list, in accordance with an example implementation.

FIG. 7 illustrates an example of a flow diagram for the drive unit creating an allocated physical media list, in accordance with an example implementation. At 700, the drive unit creates a new (empty) allocated physical media list. At 701, the drive unit selects one allocated virtual media ID that is not already selected from the allocated virtual media list in the new virtual media request. At 702, the drive unit retrieves the corresponding physical media ID of selected virtual media ID from the media mapping table by using virtual media ID that is selected, and the controller ID in the request. At 703, the drive unit adds the retrieved physical media ID to the allocated physical media list. At 704, a determination is made as to whether the drive unit selected all of the allocated virtual media IDs in the new virtual media request. If the drive unit selected all allocated virtual media IDs in the new virtual media request (Yes), then the flow ends. If not (No), the drive unit repeats the flow from 701.

Figure 8:
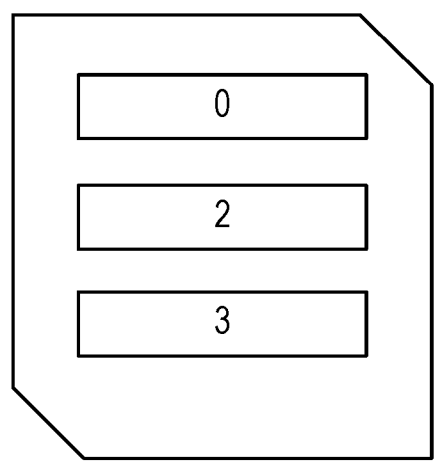
FIG. 8 illustrates an example of an allocated physical media list created by the drive unit, referring the medium mapping table and the virtual medium request, in accordance with an example implementation.

FIG. 8 illustrates an example of an allocated physical media list created by the drive unit, referring the medium mapping table (FIG. 4) and the virtual medium request (FIG. 5), in accordance with an example implementation. In the example of FIG. 5, the controller ID is 0 and the allocated virtual media IDs are 0, 1 and 2. From FIG. 4, the row in which the controller ID is 0 and the virtual medium ID is 0 shows that the corresponding physical medium ID is 0, so the drive unit adds 0 to the allocated physical media list. In the same way, the drive unit refers to the rows corresponding to the controller ID and the virtual medium IDs, and includes the physical medium IDs in the list. Thus, the drive unit creates the allocated physical media list shown in FIG. 8.

Figure 9:
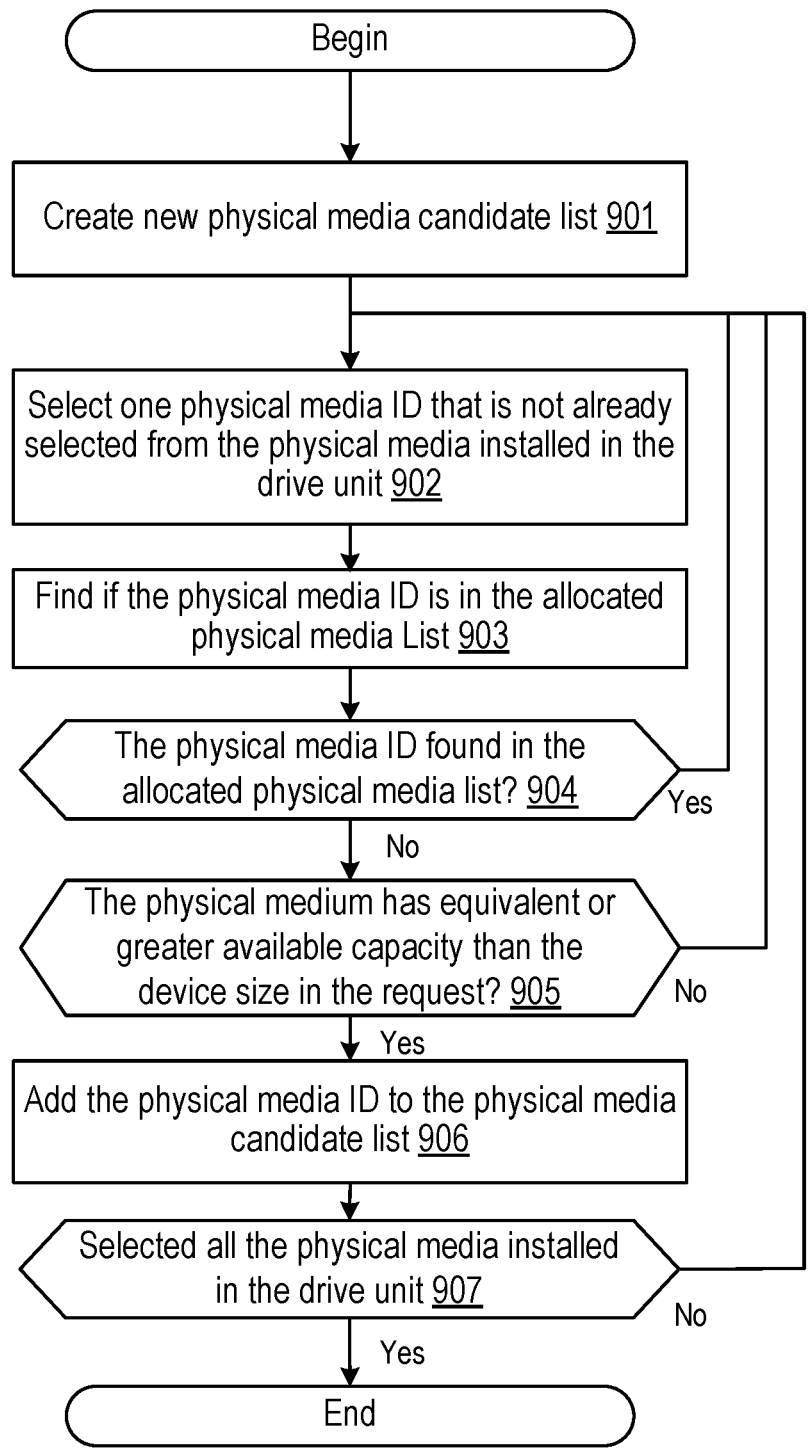
FIG. 9 illustrates an example of a flow diagram that the drive unit creates a physical media candidate list, in accordance with an example implementation.

FIG. 9 illustrates an example of a flow diagram that the drive unit creates a physical media candidate list, in accordance with an example implementation.

At 901, the drive unit creates a new (empty) physical media candidate list. At 902, the drive unit selects one ID of installed physical media that is not already selected from the physical medium table (FIG. 3). At 903, the drive unit finds if the physical media ID is in the allocated physical media list (FIG. 8).

At 904, if the physical media ID is in the allocated physical media list (Yes), then the drive unit repeats the flow from 902. Otherwise, if the physical media ID is not in the allocated physical media list (No), then the drive unit checks if the physical medium corresponding to the ID has an equivalent or greater available capacity than the medium size in the request at 905. If the medium has insufficient capacity the requested medium size (No), then the drive unit repeats the flow from 902. Otherwise, if the physical medium has sufficient capacity (Yes), then the drive unit adds the physical media ID to the physical media candidate list at 906.

At 907, if the drive unit selected all the physical media installed in the drive unit (Yes), then the flow ends. If not (No), the drive unit repeats the flow from 902.

Figure 10:
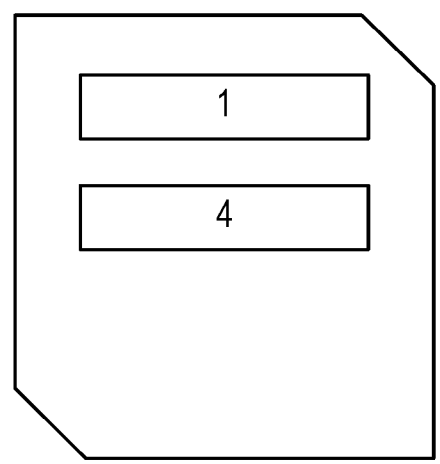
FIG. 10 illustrates an example of the physical media candidate list created by the drive unit, by referring the physical medium table and the allocated physical media list, in accordance with an example implementation.

FIG. 10 illustrates an example of the physical media candidate list created by the drive unit, by referring the physical medium table (FIG. 3) and the allocated physical media list (FIG. 8), in accordance with an example implementation. In this example, the drive unit first selects the physical media ID 0 from the physical medium table that is installed in the drive unit. Then the drive unit finds if the ID 0 exists in the allocated physical media list. In this case, the ID 0 exists so it is not added to the physical media candidate list. Next, the drive unit selects the physical media ID 1 from the physical medium table and compares the physical media ID with the allocated physical media list. In this example, the physical media ID 1 does not exist in the allocated physical media list, so the drive unit checks if there is available capacity in the corresponding physical media. One example to know the available capacity is to refer to the capacity entry in the physical medium table and corresponding entries of Physical Medium Start address and Size in the medium mapping table. In this example, the physical medium 1 has 2 TB of total capacity and only 256 GB of the capacity starting from address 0x00000000 is used, so there is sufficient remaining capacity for the request. Thus, the physical medium ID 1 is added to the physical media candidate list. By repeating these processes, the physical media candidate list is thereby created.

Figure 11:
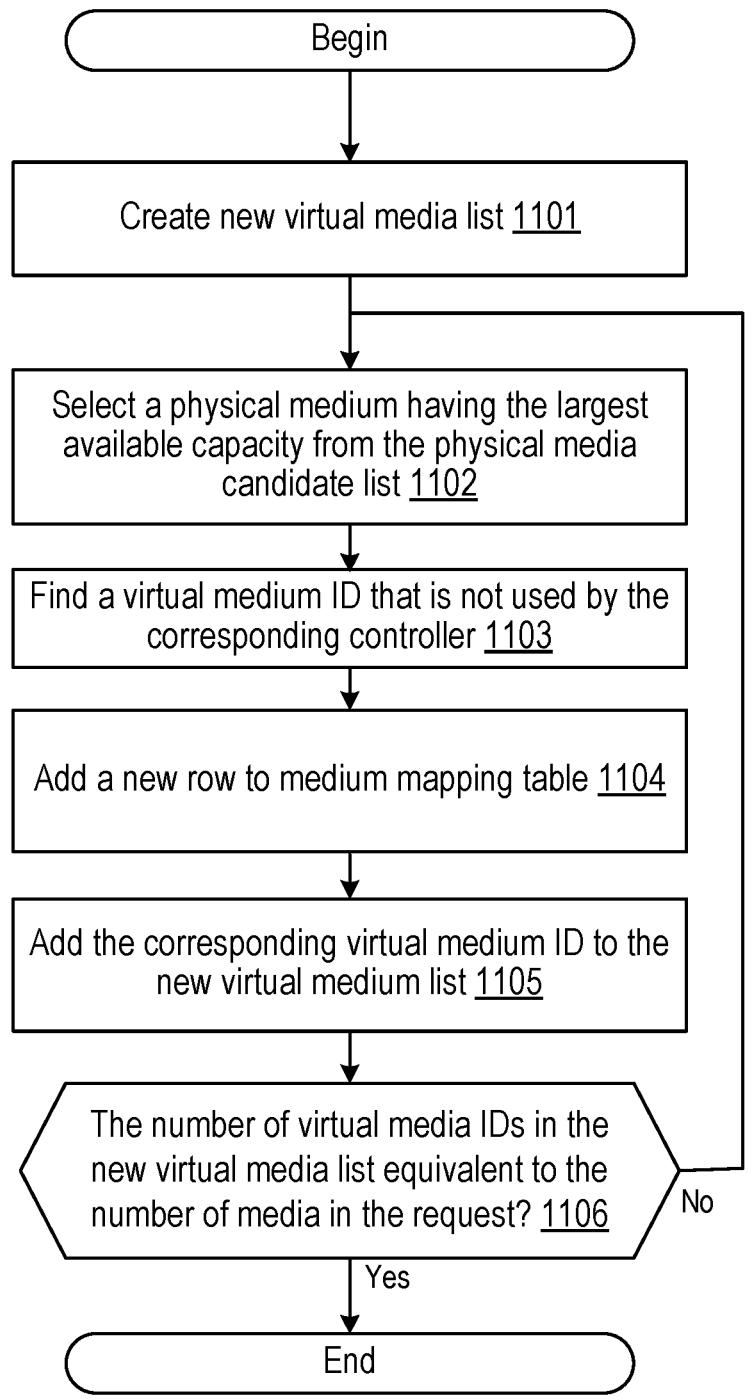
FIG. 11 illustrates an example of a flow diagram that the drive unit uses to create a new virtual media list for the request from the controller, in accordance with an example implementation.

FIG. 11 illustrates an example of a flow diagram that the drive unit uses to create a new virtual media list for the request from the controller, in accordance with an example implementation. At 1101, the drive unit creates a new (empty) virtual media list. At 1102, the drive unit selects a physical medium having the largest available capacity from the physical media candidate list. The rule of priority which physical medium to use here is just one example and the example implementations are not limited thereto, and can be modified to fit the desired implementation. At 1103, the drive unit finds a virtual medium ID that is not used by the corresponding controller by reference to the medium mapping table.

At 1104, the drive unit adds a new row to the medium mapping table. Each column of the row can involve the following fields:

Controller ID: The ID of the controller that requests a new virtual medium.

Virtual medium ID: The virtual medium ID found in the third process in this flow.

Physical medium ID: The physical medium ID selected in the second process in this flow.

Physical medium start address: The address of the physical medium where corresponding virtual medium starts.

Size: The medium size that the controller requests.

At 1105, the drive unit adds the virtual medium ID found in the third process in this flow to the new virtual media list. At 1106, if the number of virtual media IDs in the new virtual media list is equivalent to the number of media in the request (Yes), then the drive unit ends the flow. Otherwise (No), the drive unit repeats the flow from the 1102.

Figure 12:
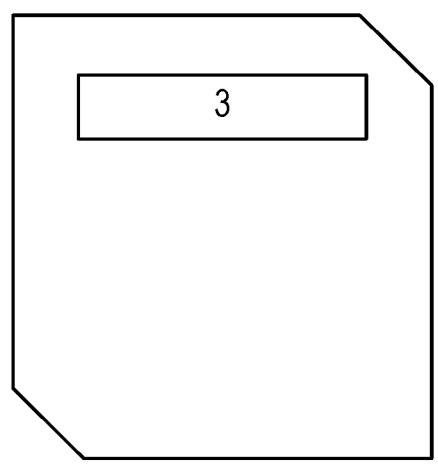
FIG. 12 shows an example of a new virtual media list created by the drive unit, referring to the physical medium table and the physical media candidate list, in accordance with an example implementation.

FIG. 12 shows an example of a new virtual media list created by the drive unit, referring to the physical medium table (FIG. 4, FIG. 13) and the physical media candidate list (FIG. 10), in accordance with an example implementation.

FIG. 13 illustrates the medium mapping table as updated from the example of FIG. 4, in accordance with an example implementation. In the example, the physical media 1 and 4 are the candidates but the physical media 1 has the larger remaining capacity, so the physical media 1 is selected. Then, the drive unit finds an unused virtual medium ID in the requested controller by referring to the medium mapping table. In this case, the virtual medium ID 3 is not used by the controller ID 0, so the ID 3 is selected. Then the drive unit adds a new row to the medium mapping table (FIG. 13). As depicted in the virtual medium request (FIG. 5), the requested controller ID is 0. The selected virtual medium ID and the selected physical medium ID in the previous processes are 3 and 1, respectively. Then, the drive unit allocates the requested capacity to the physical medium by deciding the start address. In this case, the drive unit decided 0x10000000, so the 512 GB of region starting from 0x10000000 in the physical medium ID 1 is set as the virtual media 3 of the controller 0. Then, the drive unit adds the virtual media ID 3 to the new virtual media list (FIG. 12). The controller requests only one medium, so the flow ends here in this example.

Figure 15:
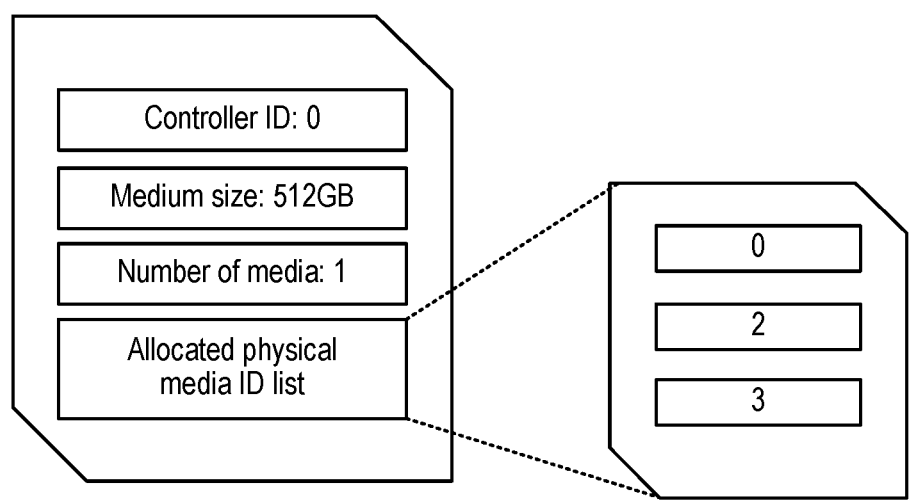
FIG. 15 illustrates an example physical medium request, in accordance with an example implementation.
Figure 16:
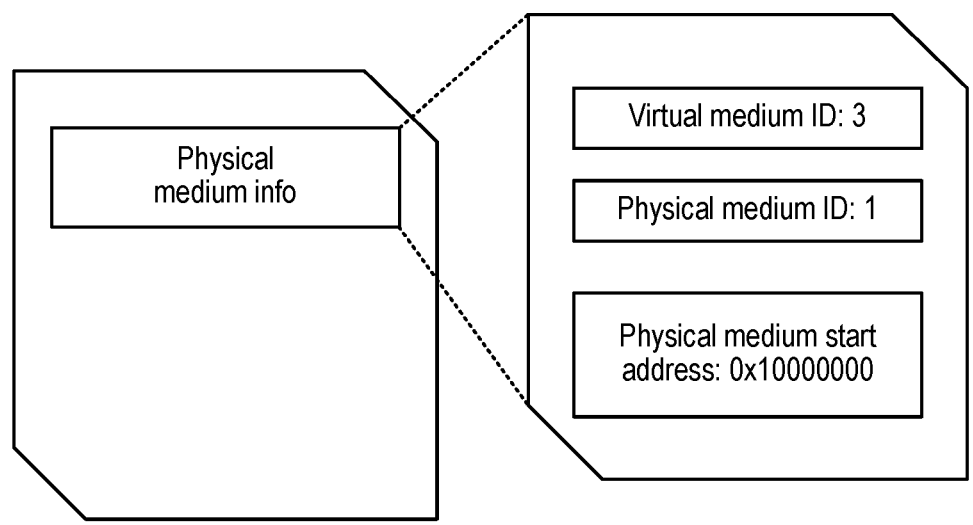
FIG. 16 illustrates an example physical medium response, in accordance with an example implementation.

In another example implementation, a storage controller has a controller medium mapping table as shown in FIG. 14. The controller medium mapping table is similar to the medium mapping table, but it only manages information for the media used by the controller. In this example implementation, the procedure shown in FIG. 7 (creating an allocated physical media list shown in FIG. 8) is done by the controller instead of the drive unit. Then, the controller requests a new medium using a physical medium request as shown in FIG. 15. This request is similar to a virtual media request shown in FIG. 5, but it has an allocated physical media ID list, instead of an allocated virtual media ID list. Another difference from the previous example implementations is the response. In this example implementation, the physical medium response as shown in FIG. 16 is used because the controller medium mapping table (FIG. 14) should be updated. This response includes one or more physical medium info, each of which involve a virtual medium ID, a physical medium ID and a physical medium start address.

The example implementations described herein can also be applied to a computer system as follows.

Figure 17:
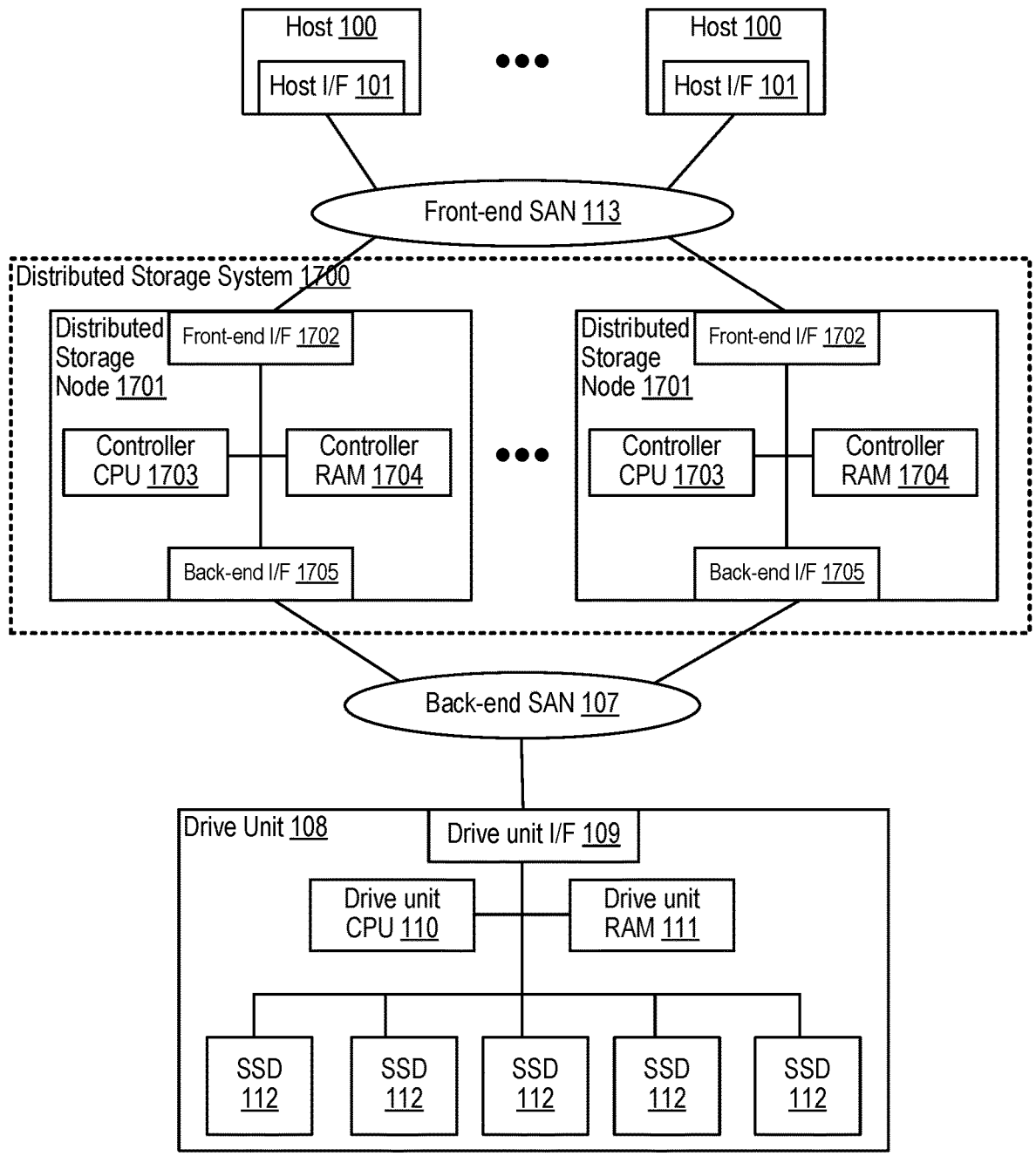
FIG. 17 illustrates an overview of another type of computer system, in accordance with an example implementation.

FIG. 17 illustrates an overview of another type of computer system, in accordance with an example implementation. The computer system involves of one or more hosts 100, a distributed storage system 1700 involving plurality of distributed storage nodes 1701 and a drive unit 108. The hosts 100 are connected to the distributed storage nodes 1701 via a front-end Storage Area Network (SAN) 113. The drive unit 108 is connected to the distributed storage nodes 1701 via a back-end SAN 107.

The configuration of hosts 100 and the drive unit 108 in this example implementation is the same as the example implementation of FIG. 1. A distributed storage node 1701 involves a front-end I/F 1702, a back-end I/F 1705, a controller CPU 1703 and a controller RAM 1704. The front-end I/F 1702 is an interface that communicate with hosts 100 via the front-end SAN 113. The back-end I/F 1705 is an interface that communicates with drive unit 108 via the back-end SAN 107. The controller RAM 1704 can include an area where a program and metadata used by the controller CPU 1703 to control the distributed storage node 1701 is stored, and a cache memory area where data is temporarily stored. One or more distributed storage nodes 1701 have a capability of controlling not only the corresponding node but also the whole distributed storage system 1700. The controller RAM 1704 can be volatile medium or non-volatile medium, depending on the desired implementation.

In example implementations, CPU 1703 can be configured to provide a virtual medium allocation request comprising an identifier of the each of the plurality of distributed nodes to the drive unit; receive a set of virtual mediums eligible for inclusion into the chunk group, the set of virtual mediums corresponding to physical mediums in the drive unit that are unused by the each of the plurality of distributed nodes; and allocate one or more virtual mediums from the set of virtual mediums to the chunk group through extensions of the example implementations illustrated in FIGS. 2-16. The virtual medium allocation request can also include chunk group information corresponding to the each of the distributed storage nodes, the chunk group information comprising one or more of a first set of a plurality of virtual mediums allocated to the chunk group and a second set of a plurality of physical mediums allocated to the chunk group through extensions of FIGS. 4(*a*) and 4(*b*). In another example, the virtual medium allocation request can also include a set of the physical mediums allocated to the each of the distributed nodes as illustrated in FIG. 4(*b*).

Figure 18:
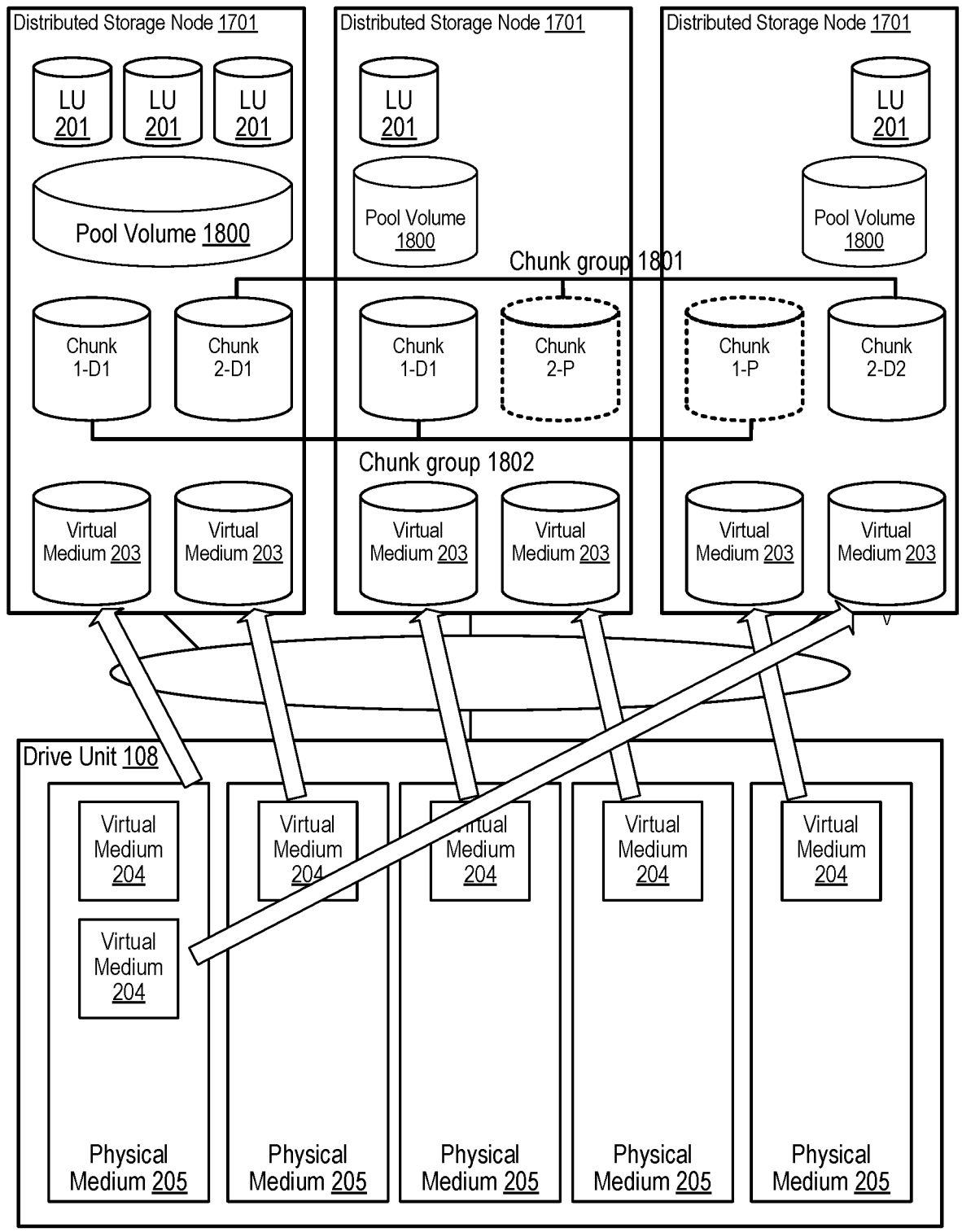
FIG. 18 illustrates a logical configuration of the computer system of FIG. 17, in accordance with an example implementation.

FIG. 18 illustrates a logical configuration of the computer system of FIG. 17, in accordance with an example implementation. In the example implementation, the drive unit 108 has the same capability as the example implementation of FIG. 2. The distributed storage has a capability of controlling multiple storage media in different distributed storage nodes 1700 as a chunk group 1801, 1802 and in each media in the chunk group, either data or parity is stored for reliability. For instance, in the example of FIG. 18, Chunk 1-D1, Chunk 1-D2 and Chunk 1-P are in the same chunk group 1802, and parity data derived from data in Chunk 1-D1 and Chunk 1-D2 is stored in Chunk 1-P. The storage media for the chunk group can be physical media, or virtual media provided by the drive unit 108. The pool volume 1800 is a virtual volume involving chunk volumes in each of the nodes 1701. As Chunk 1-P and Chunk 2-P are chunk volumes for parity data, they are not used as a part of pool volumes 1800. A logical unit (LU) 201 in this example involves a part of the pool volume. The LU is a unit of a storage recognized by a host.

In the example implementation of FIGS. 17 and 18, the request of virtual medium and the behavior of drive unit in response to the request is essentially the same. The difference is that the allocated virtual media list in a virtual media request describes a list of virtual media IDs that the storage controller already uses in the RAID group in the previous example implementations. In this example implementation, the allocated virtual media list describes a list of virtual media IDs that the distributed storage system already uses in the chunk group.

Through the example implementations described herein, a physical medium (e.g. SSD) can thereby be shared among multiple storage controllers or storage nodes in a distributed storage system, while keeping them physically independent in a redundancy group to avoid a single point of failure.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A drive unit, comprising:
a plurality of physical mediums;
a plurality of virtual mediums distributed across the plurality of physical mediums; and
a processor, configured to:
determine, from a virtual medium allocation request received from a storage controller of the one or more storage controllers, a controller identifier of the storage controller;
determine a first set of the plurality of virtual mediums allocated to the storage controller based on the controller identifier;
determine a second set of the plurality of physical mediums corresponding to the first set of the plurality of virtual mediums allocated to the storage controller; and
respond to the virtual medium allocation request with a third set of the plurality of virtual mediums corresponding to remaining ones of the plurality of physical mediums outside of the second set of the plurality of physical mediums, wherein, after the drive unit receives a new virtual media request from the storage controller, the drive unit creates a physical media candidate list and an allocated physical media list corresponding to the new virtual media request, the drive unit compares a number of IDs in the physical media candidate list to a number of media in the new virtual media request, and wherein, if the number of IDs in the physical media candidate list is equivalent to or larger than the number of media in the new virtual media request, the drive unit creates a new virtual media list, updates a media mapping table corresponding to the new virtual media list, and notifies the new virtual media list to the storage controller.

2. The drive unit of claim 1, wherein the plurality of virtual mediums are configured to be provided to one or more redundant array of inexpensive disk (RAID) groups, wherein the request further comprises RAID group information corresponding to the storage controller, the RAID group information comprising one or more of the first set of the plurality of virtual mediums and the second set of the plurality of physical mediums.

3. The drive unit of claim 1, further comprising a memory configured to manage a mapping between controller identifiers, the plurality of virtual mediums, and the plurality of physical mediums, wherein the processor is configured to:
determine the first set of the plurality of virtual mediums allocated to the storage controller based on the controller identifier through referring to the mapping between the controller identifiers and the plurality of virtual mediums; and
determine the second set of the plurality of physical mediums corresponding to the first set of the plurality of virtual mediums allocated to the storage controller through referring to the mapping between the plurality of virtual mediums and the plurality of physical mediums.

4. The drive unit of claim 1, wherein the virtual medium allocation request comprises the second set of physical mediums, wherein the processor is configured to determine the second set of the plurality of physical mediums corresponding to the first set of the plurality of virtual mediums allocated to the storage controller from the request.

5. The drive unit of claim 1, wherein, if the number of IDs in the physical media candidate list is less than the number of media in the new virtual media request, the drive unit notifies the storage controller that the new virtual media request is refused to be accepted.

6. The drive unit of claim 1, wherein the plurality of physical mediums are shared among multiple controllers of the storage controllers in a distributed storage system while keeping the plurality of physical mediums physically independent in a redundant group.

7. A storage controller managing a redundant array of inexpensive disk (RAID) group of virtual mediums and connected to a drive unit configured to provide physical mediums for the RAID group of virtual mediums, the storage controller comprising:
a processor, configured to:
provide a virtual medium allocation request comprising a controller identifier of the storage controller to the drive unit;
receive a set of virtual mediums eligible for inclusion into the RAID group, the set of virtual mediums corresponding to physical mediums in the drive unit that are unused in the RAID group; and
allocate one or more virtual mediums from the set of virtual mediums to the RAID group,
wherein, after the drive unit receives a new virtual media request from the storage controller, the drive unit creates a physical media candidate list and an allocated physical media list corresponding to the new virtual media request, the drive unit compares a number of IDs in the physical media candidate list to a number of media in the new virtual media request, and
wherein, if the number of IDs in the physical media candidate list is equivalent to or larger than the number of media in the new virtual media request, the drive unit creates a new virtual media list, updates a media mapping table corresponding to the new virtual media list, and notifies the new virtual media list to the storage controller.

8. The storage controller of claim 7, wherein the virtual medium allocation request further comprises RAID group information corresponding to the storage controller, the RAID group information comprising one or more of a first set of a plurality of virtual mediums allocated to the RAID group and a second set of a plurality of physical mediums allocated to the RAID group.

9. The storage controller of claim 7, wherein the virtual medium allocation request comprises a set of the physical mediums allocated to the storage controller.

10. A distributed system comprising a plurality of distributed storage nodes managing a chunk group of virtual mediums for a corresponding pool volume, and connected to a drive unit configured to provide physical mediums for the chunk group of virtual mediums, each of the plurality of distributed nodes comprising:
a processor, configured to:
provide a virtual medium allocation request comprising an identifier of the each of the plurality of distributed nodes to the drive unit;
receive a set of virtual mediums eligible for inclusion into the chunk group, the set of virtual mediums corresponding to physical mediums in the drive unit that are unused in the chunk group; and
allocate one or more virtual mediums from the set of virtual mediums to the chunk group,
wherein, after the drive unit receives a new virtual media request from the processor, the drive unit creates a physical media candidate list and an allocated physical media list corresponding to the new virtual media request, the drive unit compares a number of IDs in the physical media candidate list to a number of media in the new virtual media request, and
wherein, if the number of IDs in the physical media candidate list is equivalent to or larger than the number of media in the new virtual media request, the drive unit creates a new virtual media list, updates a media mapping table corresponding to the new virtual media list, and notifies the new virtual media list to the processor.

11. The distributed system of claim 10, wherein the request further comprises chunk group information corresponding to the each of the distributed storage nodes, the chunk group information comprising one or more of a first set of a plurality of virtual mediums allocated to the chunk group and a second set of a plurality of physical mediums allocated to the chunk group.

12. The distributed system of claim 10, wherein the virtual medium allocation request comprises a set of the physical mediums allocated to the each of the distributed nodes.

* * * * *